United States Patent

[11] 3,578,175

[72] Inventor Serop Manjikian
 Del Mar, Calif.
[21] Appl. No. 818,514
[22] Filed Apr. 23, 1969
[45] Patented May 11, 1971
[73] Assignee Universal Water Corporation
 Del Mar, Calif.

[54] HELICALLY WOUND SEMIPERMEABLE MEMBRANE
 11 Claims, 14 Drawing Figs.
[52] U.S. Cl. ................................................ 210/489,
 210/497.1
[51] Int. Cl. ............................................... B01d 31/00
[50] Field of Search............................................ 210/23,
 321, 497.1, 490, 491, 489, 433, 500

[56] References Cited
 UNITED STATES PATENTS
2,987,472 6/1961 Kollsman...................... 210/23
3,042,216 7/1962 Goldman...................... 210/489X
3,044,957 7/1962 Pow et al. .................... 210/500X
3,156,645 11/1964 Chapin et al.................. 210/120
3,396,103 8/1968 Huntington .................. 210/23
3,442,392 5/1969 Skelley........................ 210/491
3,446,359 5/1969 Loeb et al..................... 210/321X
3,457,170 7/1969 Havens......................... 210/490X
3,457,171 7/1969 Flowers et al................. 210/23

OTHER REFERENCES

U.S. Dept. of Interior Office of Saline Water Red Progress Report No. 86, " Design & Construction of a Pesalination Pilot Plant (a Reverse Osmosis Process)," By Aerojet-General Corp., Received in Patent Office April 10, 1964, Distributed by U.S. Dept. of Commerce, pp. 13 and 14 relied on.

Primary Examiner—Frank A. Spear, Jr.
Attorney—Clement H. Allen

ABSTRACT: A membrane element, useful in treatment of a solution by osmosis or reverse osmosis, comprises a porous support structure around which is a semipermeable membrane preferably formed by helically winding a strip of semipermeable membrane material. The edges of adjacent turns of membrane strip are preferably overlapped and the overlapped portions are bonded together as by use of adhesive, or solvent bonding. An intermediate layer of porous backing material may be employed between the support structure and the membrane, and this can be formed by helically winding a strip, for example, of nylon cloth, preferably with contiguous edges abutted. The support structure may be of circular cross section outline, or may be of polygonal outline. A helically wound backing layer may be employed with a membrane cast on its surface.

Patented May 11, 1971

INVENTOR.
SEROP MANJIKIAN

BY 
Agent

Patented May 11, 1971
3,578,175
2 Sheets-Sheet 2
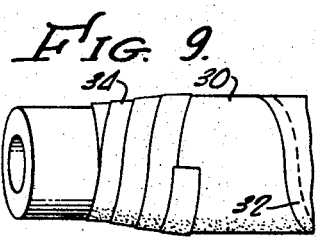
FIG. 9.
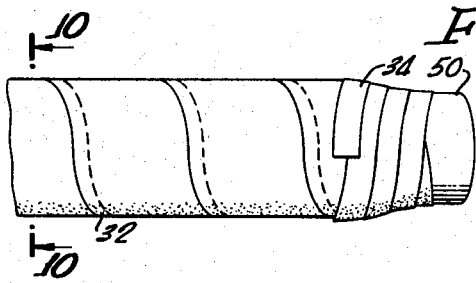
FIG.
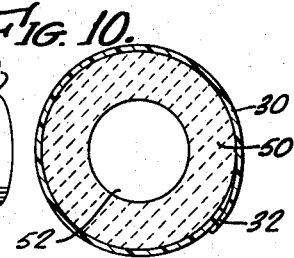
FIG. 10.
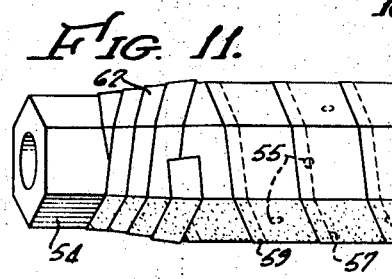
FIG. 11.
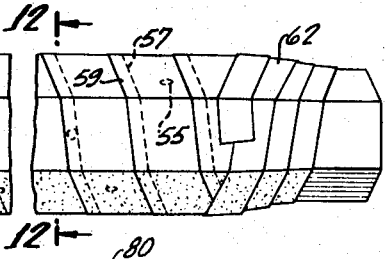
FIG.
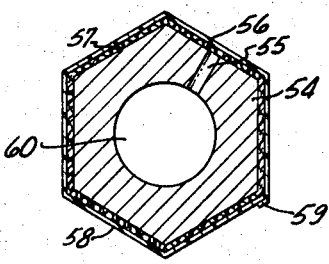
FIG. 12.
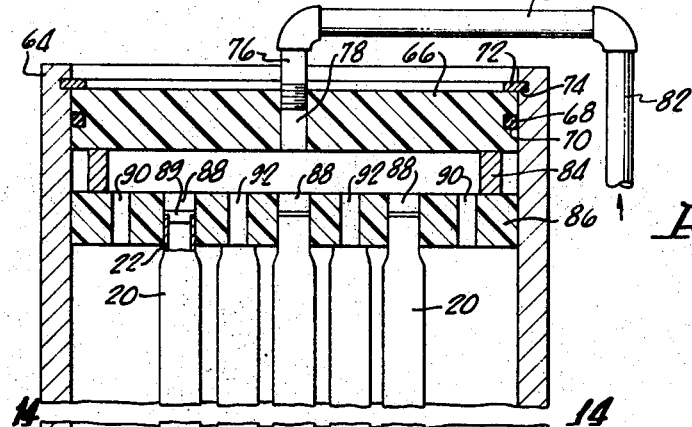
FIG. 13.
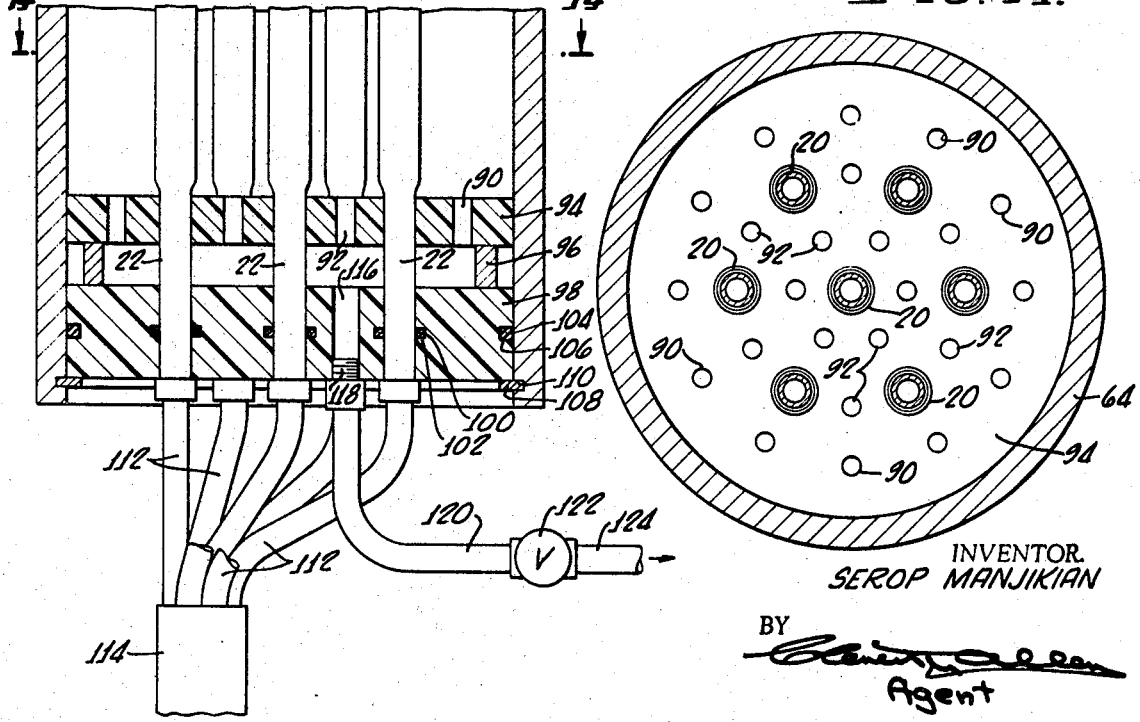
FIG. 14.
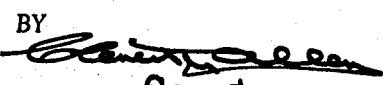
INVENTOR.
SEROP MANJIKIAN
BY
Agent

HELICALLY WOUND SEMIPERMEABLE MEMBRANE

This invention relates to production of membrane elements useful in treatment by osmosis or reverse osmosis. The membrane element, as referred to herein, comprises a suitable support structure and a membrane, and may include permeable backing material between the support and the membrane.

Semipermeable membranes are used in equipment for treating solutions by osmosis or reverse osmosis which results in production of a purified liquid and a concentrate or brine containing an increased concentration of the solute in the original solution. Reverse osmosis requires elevated pressure, sometimes extremely high pressure, to provide sufficient driving force for efficient osmotic action. Therefore, the semipermeable membrane must be properly supported since it is itself relatively delicate. Several methods have been employed to support membranes. They may be supported by a flat porous grid in a plate and frame structure. They may be formed as tubes and inserted in a perforated support tube with permeable intermediate backing material to provide lateral flow of product water to the support tube perforations. Membranes may be cast directly on the permeable support structures, such as tubes or rods. Flat membranes are relatively easy and economical to produce. They can be formed continuously on the surface of a rotating drum, immersed in quenching water and the resulting elongated strip can be coiled. Membranes cast in tubular form on or for use inside a tube or rod support structure are however more efficient in operation since liquid flow and boundary layer concentration can be much more readily controlled in equipment using elongated units rather than flat areas. On the other hand, production of tubular or direct cast membranes is more costly and difficult than that of flat membranes, whose production methods can utilize much available know-how and technology in the film production field.

Summarized briefly this invention contemplates a membrane element useful in osmosis or reverse osmosis, which comprises a permeable support structure and a membrane in the form of a semipermeable strip helically wound around the support structure. Backing material of fabric such as nylon cloth, or permeable paper, such as filter paper, may be interposed between the membrane and the support structure and this may be formed as a strip also helically wound around the support structure. In the case of the helically wound membrane, it is preferred to overlap edges of adjacent turns and to bond or seal these overlaps with an adhesive or solvent. In the case of helically wound backing material, it is preferred to abut the adjacent edges to form a smooth backing surface for the membrane. It will be understood that either or both the membrane or the backing material may be helically wound and that a plurality of helically wound layers of backing may be employed.

The support structure for the membrane may be circular or polygonal in cross section outline. Cylindrical support structure bodies are readily fabricated and wound with semipermeable strip and backing material. Polygonal shapes, for example, of triangular or hexagonal cross section can, however, be arranged in multiple assemblies with better open space dimension uniformity, resulting in better solution distribution over the surfaces of the membranes, and better packing density, that is membrane area per unit volume, with desirable flow spaces. Polygonal shapes, however, should have no concave sections and their faces should be flat or slightly convex.

Construction and operation of the membrane element of this invention will become clear from the following detailed description thereof and from the annexed drawings in which:

FIG. 9 shows a perspective view of a modification of the membrane element in which the membrane is helically wound directly on a permeable support rod.

FIG. 10 shows a vertical cross section (enlarged) of the element of FIG. 9 taken along the line 10–10.

FIG. 11 shows a perspective view of a modification of the membrane element in which the permeable support rod is of polygonal cross section.

FIG. 12 shows a vertical cross section (enlarged) of the membrane element of FIG. 11 taken along the line 12–12.

FIG. 13 shows a reverse osmosis system illustrating use of the membrane elements of this invention.

FIG. 14 shows a horizontal cross section of the apparatus of FIG. 13 taken along the line 14–14.

Figure 1:
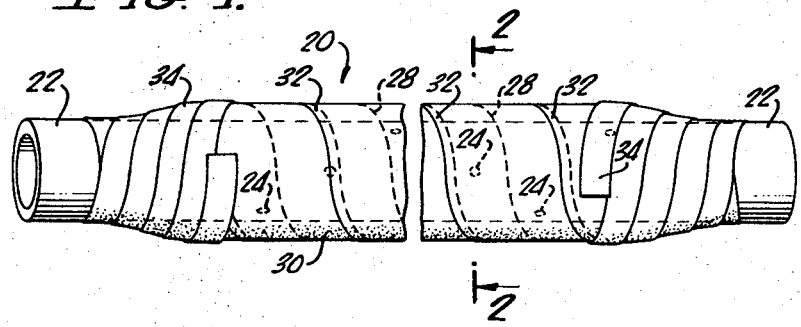
FIG. 1 shows a perspective view of a membrane element embodying features of this invention.
Figure 2:
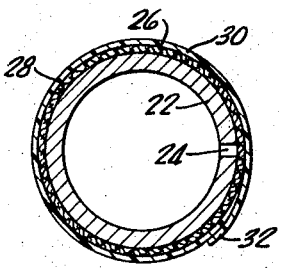
FIG. 2 shows a vertical cross section (enlarged) of the element of FIG. 1 taken along the line 2–2.

Referring now particularly to FIGS. 1 and 2, the membrane element 20 comprises a central tube 22, which may be fabricated of relatively strong material such as metal or high strength plastic, and which is made permeable be being perforated at intervals over its central area, as at 24. Around the surface of tube 22 is helically wound by conventional methods, a strip 26 of backing material such as porous nylon cloth or filter paper. Preferably the contiguous edges of adjacent wound turns of strip 26 do not overlap but are abutted as at 28. Semipermeable membrane strip 30 is helically wound over the surface of helically wound backing strip 26. This membrane may be fabricated as a flat elongated strip rolled up into a coil and is helically wound around the outside of backing strip 26 by conventional means. Preferably the contiguous edges of adjacent wound turns of membrane strip 30 are overlapped as at 32. At the overlap 32 the lapped edges are preferably bonded and maintained in sealed relationship by application therebetween of a suitable adhesive, or by application of a solvent composition which will dissolve a thin layer of membrane at each surface and, upon setting, form a strong antogenous bond. The ends of the helical windings of the semipermeable membrane strip 30 and the porous backing structure strip 26 are conveniently sealed to the tube 22 at each end by suitable means, for example, adhesive plastic tape winding 34, which may also serve to prevent unwrapping of the membrane strip.

Figure 3:
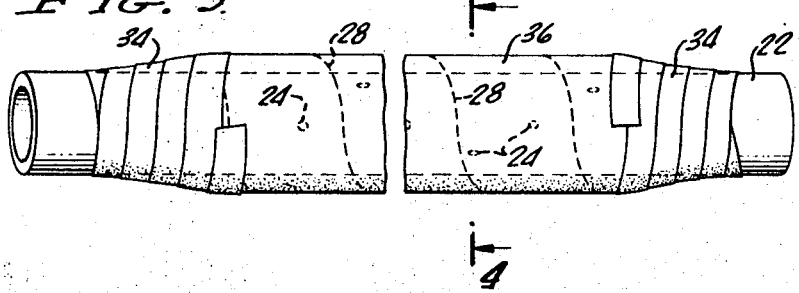
FIG. 3 shows a perspective view of a modification of the membrane element in which the backing structure only is helically wound.
Figure 4:
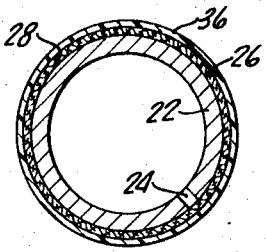
FIG. 4 shows a vertical cross section (enlarged) of the element of FIG. 3 taken along the line 4–4.

FIGS. 3 and 4 is shown a modification of the membrane element of FIG. 1 in which the central porous tube 22 is wrapped with a helically wound strip of nylon cloth 26 with adjacent turn edges abutted at 28 as before. Around wound strip 26 is cast a tubular semipermeable membrane 36, which may be cast, for example, by lowering tube 22 with backing strip 26 vertically through an orifice in the bottom of a vessel containing a casting solution adapted to form a membrane film. The thickness of the membrane film deposited will be regulated by the difference in diameter between the orifice and the wrapped porous tube. The ends of the cast membrane 36 and helically wound backing strip 26 are sealed as before by tape windings 34.

Figure 5:
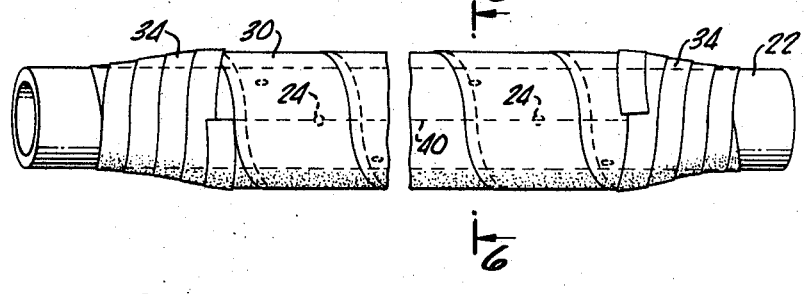
FIG. 5 shows a perspective view of a modification of the membrane element in which the membrane only is helically wound.
Figure 6:
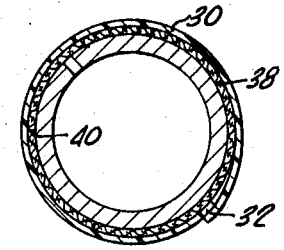
FIG. 6 shows a vertical cross section (enlarged) of the element of FIG. 5 taken along the line 6–6.

In FIGS. 5 and 6 is shown another modification in which a convolute wound strip of nylon cloth 38 is employed with horizontal abutted edges as at 40, with an outer helically wound membrane strip 30 applied in the same manner as in the embodiment of FIG. 1 with overlapping edges as at 32. The ends of the membrane strip winding and the backing structure nylon cloth are sealed as before by tape winding 34.

Figure 7:
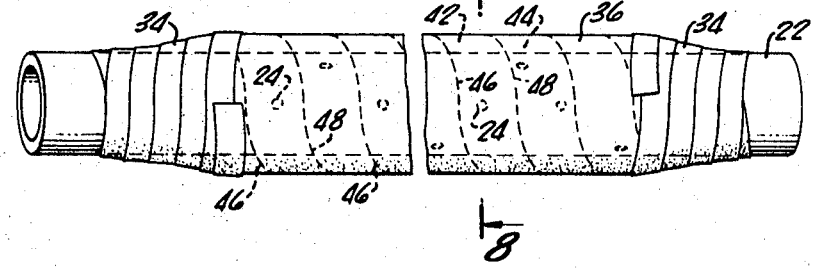
FIG. 7 shows a perspective view of a modification of the membrane element in which two layers of backing material are helically wound under the membrane.
Figure 8:
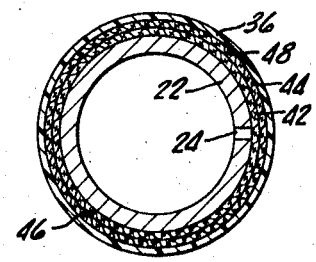
FIG. 8 shows a vertical cross section (enlarged) of the element of FIG. 7 taken along the line 8–8.
Figure 8:
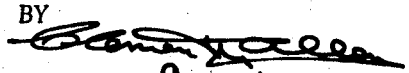

In FIGS. 7 and 8 is shown another modification in which a plurality of layers of porous strip 42 and 44 such as of nylon cloth are helically wound around central tube 22. The edges of the turns of wound strips 42 and 44 are abutted as at 46 and 48 respectively. Around the outer porous strip winding 44 is cast a tubular semipermeable membrane 36 by the same method used and described for production of the membrane in the element of FIG. 3. The ends of membrane 36 and of the porous backing structure windings 42 and 46 are sealed, as by tape winding 34.

In FIGS. 9 and 20 is shown yet another modification in which the backing structure is formed of a cylindrical solid permeable body 50 fabricated of relatively strong material such as ceramic or plastic and which is porous in the sense that it is characterized by overall permeability and not by the presence of holes drilled or otherwise formed at intervals in a tubing wall. The overall permeability and uniformity of surface of body 50 can be such as to not require a cloth or filler paper backing structure for membrane support and lateral flow. In the embodiment of FIGS. 9 and 10 a membrane strip 30 is helically wound directly on the surface of permeable body 50 with overlapped edges as previously described at 32. End sealing tape windings 34 are employed as in the other embodiments described. Body 50 is preferably fabricated with a central bore 52 to collect product water passing through its walls and to reduce the travel path of product water through such body.

In FIGS. 11 and 12 is shown another modification in which a support structure of polygonal cross section outline is employed. In the embodiment illustrated the support structure 54 is an elongated hexagonal body with perforations 55 as shown. A layer of porous backing material, such as nylon cloth in the form of a strip 56 is helically wound around the support body with contiguous edges of adjacent turns abutted at 57 as in the embodiments of FIGS. 1—2 and 7—8. Around backing material 56 is helically wound a strip of semipermeable membrane 58 with edges overlapping as at 59. The central bore 60 in support 54 collects water transmitted from backing strip 56 through perforations 55. Means for sealing the ends of wound membrane strip 56 are provided, for example, adhesive tape winding 62.

In FIGS. 13 and 14 is shown an example of use of membrane elements according to this invention in a reverse osmosis system. A tubular pressure resistant casing 64 is closed at one end (the top as shown in FIG. 13) by upper end plate 66 which is sealed to the inner wall of casing 64 by O-ring 68 in groove 70. Snap ring 72 fits in groove 74 in the inner surface of casing 64 to hold end plate 66 in place. End plate 66 is provided with screwed fitting 76 and channel 78 to supply feed solution through pipe 80 under pressure supplied by inlet 82 from a suitable source not shown. Next to end plate 66 in casing 64 is spacer ring 84 and below it is membrane element end support plate 86. A plurality of membrane elements 20 which, for example only, are shown as those previously illustrated in FIGS. 1 and 2, are arranged with the upper ends of their central tubes 22 in holes 88 in plate 86. Suitable plugs 89 are employed to seal the upper ends of tubes 22 of membrane elements 20. Support plate 86 is also provided with a number of holes 90 and 92 and arranged geometrically to control the flow of feed solution from feed channel 78 in end plate 66 to distribute the flow over the outside surfaces of membrane elements 20. At their bottoms, membrane elements 20 have extended ends of central tubes 22 passing through lower support plate 94 also provided with flow regulating holes 90 and 92 which may be of size and placement corresponding to those in upper support plate 86. Separated from lower support plate 94 by spacer ring 96 is lower end plate 98 through which pass the ends of central tubes 22 of membrane element 20. Passage of tubes 22 through lower end plate 98 is sealed in each case by O-ring 100 in its groove 102, and plate 98 itself is sealed to the inner surface of casing 64 by O-ring 104 in groove 106. The assembly in casing 64 is held in place by lower snap ring 108 in groove 110 bearing against lower end plate 98 as shown. The ends of tubes 22 are connected as by manifolding conduits 112 to lead to a common container 114. Channel 116 passes through end plate 98 and into which is threaded a suitable fitting 118 connected to pipe 120, which in turn is connected to back pressure regulator valve 122 from which a suitable conduit 124 carries brine to waste or recycle.

The adhesive employed for bonding and sealing the overlapping edges of the wound membrane strip may be of any type suitable for this application, as hereinafter discussed.

The membrane element of this invention may be used in any apparatus for making separations by membrane action and backing structure is enclosed in a pressure resistant vessel and liquid to be purified is applied to the membrane outer surface at elevated pressure. Purified solution passes through the membrane, through the backing structure and to the interior of the element where it can be collected. Operation of the apparatus illustrated in FIGS. 13 and 14 will comprise connecting feed water inlet 82 to a source of water to be purified at elevated pressure. This may be domestic water at household line pressure of 60—90 p.s.i.g. if it is desired to convert such domestic water to purified drinking water containing a reduced content of soluble salts. Purified water is collected in container 114 while the brine, more concentrated in salts is connected to sewer through pipe 24. As an example, domestic water of about 800 p.p.m. may be reduced in salt content to 100—200 p.p.m. making a superior water for the drinking and cooking, comparable to so-called bottled water.

The membrane element of this invention in which the membrane is formed as a helically wound strip, can be produced efficiently and economically. Use of a flat strip for winding the membrane around the support structure makes it possible to utilize the membrane in the form of coils of strip and to fabricate these into the final membrane shapes. Such fabrication is relatively simple since tube winding machines have been highly developed and are commercially available. The membrane itself, first produced as a strip, can be produced in this form also using machinery and technology highly developed for producing plastic films of all kinds. Production of flat membrane strip on a rotating drum can be well controlled so that desired and uniform semipermeable properties are obtained. Thus the membrane after helical winding represents the result of a combination of two simple and readily controlled operations, namely, strip casting and helical winding. This results in easier and more economical production than casting a film-forming composition on a plate or tube to be transferred and set in or on the support structure, or casting directly on the support structure, which, in practice, is somewhat more difficult than it would appear. The overlapped areas of the helically wound membrane strip are, of course, nonproductive but the slight loss of area can be compensated by better and more uniform membrane properties and comparatively small increase in length or diameter to obtain equivalent working membrane surface.

An additional advantage of the helical wound membrane element of this invention is that the membrane strip or the backing material or both can be wound in place on to the support structure (with the membrane outside the backing material) with the proper tension to produce a tight fitting assembly without wrinkles or folds. This is often difficult to obtain with other production methods for example when tubular membranes are separately cast and fitted onto tubular support structures. If such tubular membranes are of large enough diameter to be readily slipped over the support structure, often covered with backing material, then they may be so loose that folds and wrinkles may result. If separately cast tubes are tight then they may be extremely difficult to place in position.

The membrane element of this invention is readily cleaned since the membrane is on its outer surface. Deposits of various kinds which build up over a period of time, can be removed from the membrane surface to restore its original condition. The membrane element is simple and can be produced economically, so that if desired it can be installed, used for a reasonable life period and then removed and thrown away, and replaced by a new element. The simplicity of the membrane element makes possible their replacement in the field.

The membrane itself may be of any material having suitable semipermeable properties. Cellulose acetate and cellulose acetate butyrate have been found to produce membranes having desirable flux and selectivity characteristics for a number of osmotic processes including purification of saline waters and concentration or separation of solutions. Other materials may be employed for particular applications. The adhesive or bonding agent used for sealing the overlapping edges of the wound membrane strip should be selected depending on the type of membrane material as will be apparent. Epoxy adhesive compositions are readily available and effective for use under a variety of conditions. An adhesive marketed by Eastman Chemical Co. under the trade designation PTD 1554 is particularly suited for sealing and gluing edges of cellulose acetate membranes. For solvent bonding, any solvent that will dissolve the membrane material to form a strong bond can be employed. Preferably the solvents are weak or diluted to that a relatively thin surface layer only is involved. Solvents such as acetone, dioxane, cyclohexanone, diacetone alcohol and butyl acetate may be employed with cellulosic membranes, particularly cellulose acetate; their effectiveness can be increased by admixing with a plasticizer such as diethyl tartrate, dimethyl phthalate and triacetin.

I claim:
1. A membrane element comprising:
   a. a permeable support structure, permeable over its central surface area and having impermeable peripheral surface areas at the ends thereof, and
   b. a membrane comprising a semipermeable membrane strip helically wound around said support structure over said permeable central surface area with adjacent turns having contiguous edges in sealed relationship.
2. A membrane element according to claim 1 in which said membrane in (b) comprises a helically wound semipermeable membrane strip with overlapping edges of adjacent turns in sealed relationship.
3. A membrane element according to claim 2 in which said overlapping edges of said semipermeable membrane strip are maintained in sealed relationship by an adhesive.
4. A membrane element according to claim 2 in which said overlapping edges of said semipermeable membrane strip are maintained in sealed relationship by solvent bonding.
5. A membrane element according to claim 1 in which said support structure in (a) is of circular cross section.
6. A membrane element according to claim 1 in which said support structure in (a) is of polygonal cross section.
7. A membrane element according to claim 1 in which a permeable backing material is interposed between said support structure in (a) and said membrane (b).
8. A membrane element according to claim 7 in which a plurality of layers of backing material is interposed between said support structure in (a) and said membrane in (b).
9. A membrane element according to claim 7 in which said backing material comprises a helically wound strip of porous fabric.
10. A membrane element according to claim 7 in which said backing material comprises a helically wound strip of filter paper.
11. A membrane element according to claim 7 in which said helically wound strip of backing material has adjacent turns with abutting edges.